April 19, 1927.  H. ALBIN  1,625,443
PASSENGER CAR
Filed April 21, 1926   2 Sheets-Sheet 1
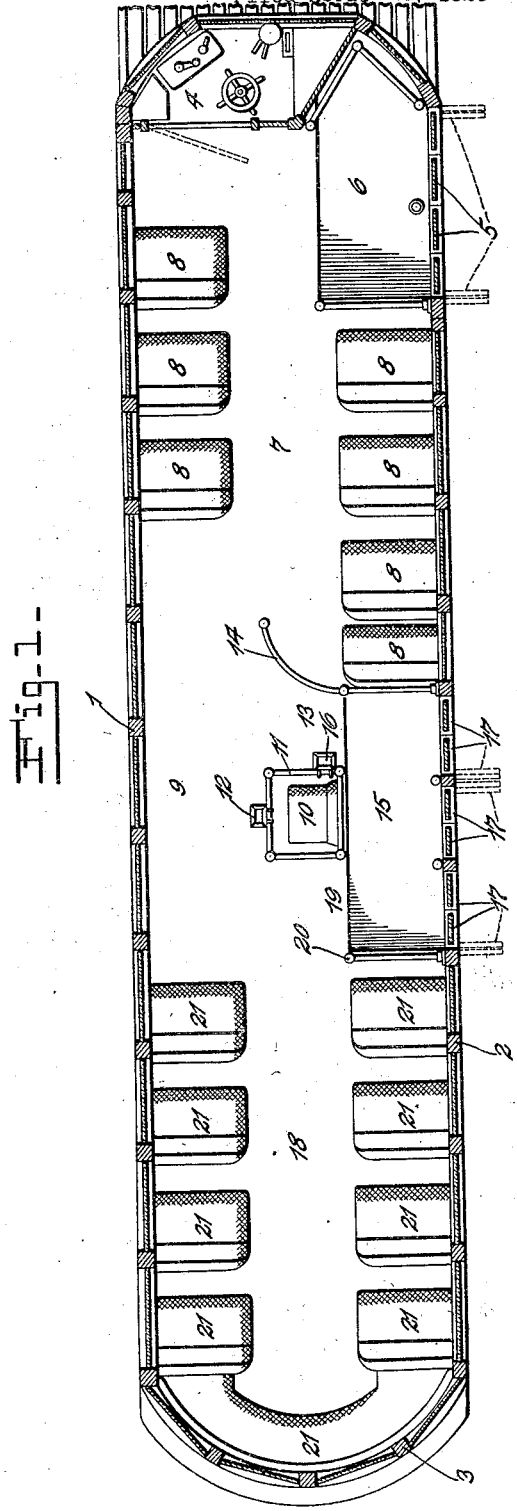
Inventor:
Herman Albin,
by Rippey & Kingsland
His Attorneys.

April 19, 1927.
H. ALBIN
1,625,443
PASSENGER CAR
Filed April 21, 1926
2 Sheets-Sheet 2
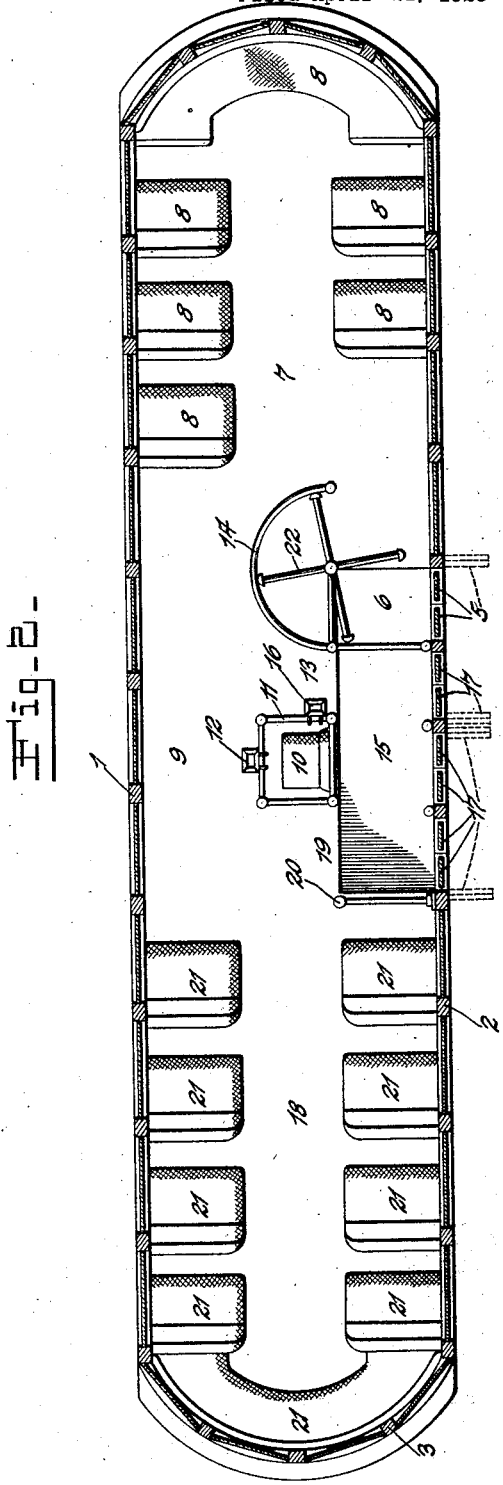
Inventor.
Herman Albin,
by his Attorneys.

Patented Apr. 19, 1927.

1,625,443

UNITED STATES PATENT OFFICE.

HERMAN ALBIN, OF ST. LOUIS, MISSOURI.

PASSENGER CAR.

Application filed April 21, 1926. Serial No. 103,439.

This invention relates to improvements in passenger cars, and consists in the novel construction hereinafter disclosed.

An object of the present invention is to provide a structure of a public conveyance which may be utilized as a passenger street car, or an automobile omnibus, with provision for segregating the passengers entering and leaving the car, so that the fares of one group are collected while the car is in motion, which group leaves the conveyance without requiring the attention of the car attendant, and the other group of which pays their fare upon leaving the conveyance, thus greatly facilitating the loading and unloading of passengers.

Another object of the invention is to provide a conveyance of the class described, so that the groups of passengers may be segregated in order to enable the use of differential fares for long and short haul passengers, or for charging different fares according to the difference in accommodations furnished the two groups.

Additional advantages of the structure will be fully apparent from the following detailed description, taken in connection with the accompanying drawings, in which, Fig. 1 shows a floor plan of a car embodying the invention.

Fig. 2 shows a floor plan modified in certain details embodying the invention.

While the invention is illustrated in the drawing as a single deck conveyance, it will, of course, be understood that the same principle of construction may be applied to double deck structures by provision of suitably positioned steps for access to and egress from the upper deck.

In the embodiment of the invention illustrated in Fig. 1, the structure of the invention is shown embodied in a motor car having the usual windowed sides 1 and 2, and a windowed end wall 3. At the front of the car, and on one side, is a partitioned motorman's station 4. Upon the side 2 is a front door opening closed by a door 5 operable by suitable connections from the motorman's station. A substantial area of the floor of the car adjacent to the door 5 is depressed, forming a depressed receiving platform 6 which is at an elevation above the ground so that access thereto may be had without the provision of steps.

In this type of construction, the car is loaded through the door 5, the passengers stepping directly upon the platform 6 and thence to the forward compartment 7 thereof, in which a plurality of seats 8 suitably spaced may be provided, if desired.

The arrangement of seats is such that there is a passageway 9 from the compartment 7 at one side of the car. The conductor's station 10, separated from the passenger area of the car by a rectangular railing 11, is positioned approximately at the center of the floor and is provided with a fare box 12 adjacent to the passageway 9. A second passageway 13 is defined by a railing 14 that extends from the side 2 well into the center of the car and is turned to direct passengers from the compartment 7 onto an unloading depressed platform 15. A second fare box 16 is positioned on the side of the railing defining the conductor's station adjacent to the passage 13 leading to the unloading platform.

The rectangular unloading platform 15 has an exit opening, in which is mounted a plurality of folding doors 17. The back compartment 18 of the car communicates with the unloading platform 15 through a passageway 19 between a railing 20 and the railing defining the conductor's station. The compartment 18 is provided with seats 21, if desired, and in case of a double deck structure, suitable stairways may lead directly from the compartment 18 to the upper deck and the exit stairway unload directly upon the unloading platform 15.

The pasesngers, after loading into the compartment 7, may either remain therein or pass, by way of the passageway 9, into the compartment 18, depositing the required fare in the fare box 12 as they move from the compartment 7 to the compartment 18. It is contemplated that this movement of passengers from the forward to the rear compartment will occur during the travel of the conveyance. As the passage of the passengers from one compartment to the other is under the control of the conductor, the number passing to the rear compartment may be limited to a number that can receive seating accommodations and also different classes of accommodations may be provided in the compartment 7 and in the compartment 18, and the upper deck may be arranged in communication with the compartment 18.

The group of passengers that remains in the compartment 7, when they desire to leave the conveyance, are required to pass from the compartment 7 to the unloading platform 15 by way of the passage 13. This movement of passengers will occur at the time the conveyance stops for unloading, and as this group of passengers leaves, the fares are deposited in the box 16. By the the provision of the two boxes 12 and 16, it is possible to segregate the different groups of passengers and to collect, if desirable, a different fare for those passing into the compartment 18, which may be justified by the better accommodations within the compartment.

In Fig. 2 of the drawing, there is illustrated a modification of the construction of Fig. 1 in that the loading platform 6 is partitioned back towards the center of the conveyance and the loading door 5 is under the control of the conductor.

In order to prevent the outward passage of passengers from the compartment 7, a one-way turnstile 22 is provided to control the passage from the loading platform to the compartment 7, said turnstile being operable to admit passengers to the compartment 7, but being locked against reverse movement from the compartment 7 to the platform 6.

I am aware that the invention may be modified in certain particulars without departing from the spirit and scope of the invention.

What I claim and desire to secure by Letters Patent is:—

1. A conveyance comprising two passenger compartments, an entrance door communicating with one of said compartments, a passageway from one compartment to the other, a conductor's station adjacent to said passageway, a fare box under the control of the conductor adjacent to said passageway, an exit passage accessible from said first-named compartment without passing said first-named passageway, and a fare box under the control of the conductor adjacent to said second-named passageway.

2. A conveyance comprising two compartments, an entrance door, a depressed receiving platform in communication with said entrance door, said receiving platform being in communication with one of said compartments, a passageway between said two compartments, a conductor's station located intermediate of said compartments, a passageway communicating with a depressed unloading platform communicating directly with said first-named compartment, a passage from said second-named compartment to said unloading platform, and two fare boxes under the control of the conductor, one positioned in the exit passage from said first-named compartment and one positioned in the passageway between said two compartments.

3. In a conveyance, a passenger receiving compartment at the forward end thereof, a rear compartment, an intermediate unloading platform accessible simultaneously from both compartments, a passageway communicating with said compartments, a fare box under the control of the conductor adjacent to the passageway between the loading compartment and the unloading platform, and a second fare box under the control of the conductor adjacent to the passageway between said compartments, and an entrance communicating with the loading compartment.

4. In a conveyance, a passenger receiving compartment at the forward end thereof, a rear compartment, an intermediate unloading platform accessible simultaneously from both compartments, a passageway communicating with said compartments, a fare box under the control of the conductor adjacent to the passageway between the loading compartment and the unloading platform, and a second fare box under the control of the conductor adjacent to the passageway between said compartments, an entrance communicating with the loading compartment, and a controlling device in said entrance permitting access to said loading compartment, but preventing egress therefrom.

HERMAN ALBIN.